US012620518B2

(12) United States Patent
Saisho et al.

(10) Patent No.: US 12,620,518 B2
(45) Date of Patent: May 5, 2026

(54) MAGNETIC PARTICLES AND METHOD FOR PRODUCING SAME, MAGNETIC CORE, AND COIL COMPONENT

(71) Applicant: Murata Manufacturing Co., Ltd., Kyoto-fu (JP)

(72) Inventors: Ryota Saisho, Nagaokakyo (JP); Hironobu Kubota, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 1136 days.

(21) Appl. No.: 17/649,105

(22) Filed: Jan. 27, 2022

(65) Prior Publication Data

US 2022/0246342 A1 Aug. 4, 2022

(30) Foreign Application Priority Data

Feb. 4, 2021 (JP) ................................ 2021-016771

(51) Int. Cl.
*H01F 27/255* (2006.01)
*H01F 1/147* (2006.01)

(52) U.S. Cl.
CPC ....... *H01F 27/255* (2013.01); *H01F 1/14733* (2013.01); *H01F 1/14791* (2013.01)

(58) Field of Classification Search
None
See application file for complete search history.

(56) References Cited

U.S. PATENT DOCUMENTS

| | | | | |
|---|---|---|---|---|
| 2021/0213524 | A1* | 7/2021 | Matsumoto | B22F 1/16 |
| 2021/0391112 | A1* | 12/2021 | Yamashita | H01F 27/255 |
| 2022/0158186 | A1* | 5/2022 | Kubota | H01M 4/62 |
| 2022/0246930 | A1* | 8/2022 | Kubota | H01M 4/0404 |
| 2022/0275216 | A1* | 9/2022 | Lechner | C09C 1/0021 |

FOREIGN PATENT DOCUMENTS

| | | | |
|---|---|---|---|
| JP | 2009-155545 | A | 7/2009 |
| JP | 2013-209693 | A | 10/2013 |
| JP | 2019-104957 | A | 6/2019 |
| WO | 2008/120721 | A1 | 10/2008 |
| WO | 2018/131536 | A1 | 7/2018 |

* cited by examiner

*Primary Examiner* — Kevin M Bernatz
(74) *Attorney, Agent, or Firm* — Studebaker Brackett PLLC

(57) ABSTRACT

Magnetic particles, each including a core made of a metal magnetic material and a coating film which covers a surface of the core, in which the coating film contains a reaction product formed using a first metal alkoxide containing no metal atom-carbon atom bond in a molecule, and a second metal alkoxide containing two or more metal atom-carbon atom bonds in a molecule.

12 Claims, 5 Drawing Sheets

3

3

MAGNETIC PARTICLES AND METHOD FOR PRODUCING SAME, MAGNETIC CORE, AND COIL COMPONENT

CROSS-REFERENCE TO RELATED APPLICATION

This application claims benefit of priority to Japanese Patent Application No. 2021-016771, filed Feb. 4, 2021, the entire content of which is incorporated herein by reference.

BACKGROUND

Technical Field

The present disclosure relates to magnetic particles and a method for producing the same, and also relates to a magnetic core and a coil component produced by using the magnetic particles.

Background Art

Coil components, such as inductors and choke coils, are used in various electrical devices and electronic devices. A coil component generally includes a coil and a magnetic core. In recent years, the size of electrical devices and electronic devices has been increasingly reduced, and consequently, there has been a demand for reduction in size of coil components used therein. Furthermore, besides being small-sized, coil components are required to have excellent magnetic, electrical and mechanical characteristics, and therefore, magnetic cores are required to have high magnetic permeability, high magnetic flux density, low loss, and high strength. In particular, when used in the high-frequency range, in order to suppress an increase in eddy current loss, magnetic cores are required to have high specific resistance. In order to satisfy such requirements, magnetic cores are known which are produced by forming a soft magnetic material into fine particles (powder), covering a surface of each particle with an insulating coating film, and performing compression molding. For example, Japanese Unexamined Patent Application Publication No. 2013-209693 discloses a magnetic core obtained by compression molding of powder of magnetic particles in which a surface of each particle is coated with carbon and further coated with a metal oxide composed mainly of silicon oxide.

SUMMARY

However, the present inventors have found that the following problems arise in the existing magnetic core (e.g., the magnetic core described in Japanese Unexamined Patent Application Publication No. 2013-209693): the magnetic particles easily adhere or cohere to each other and do not exhibit sufficient filling performance during compression molding, and therefore the resulting magnetic core has relatively low relative permeability; and the coating film does not have sufficient fracture resistance and is easily fractured during compression molding, and therefore the resulting magnetic core has relatively low specific resistance.

Accordingly, the present disclosure provides magnetic particles which are used to produce a magnetic core having sufficiently higher relative permeability and specific resistance and a method for producing the magnetic articles and to provide a magnetic core and a coil component produced by using the magnetic particles.

The present inventors have performed thorough studies in order to solve the problems described above. As a result, it has been found that, by forming a specific coating film on a surface of each core made of a magnetic material used for producing a magnetic core, it is possible to produce a magnetic core having high specific resistance and high relative permeability, thus leading to the present disclosure.

The present disclosure relates to magnetic particles, each including a core made of a metal magnetic material and a coating film which covers a surface of the core, in which the coating film contains a reaction product formed using a first metal alkoxide containing no metal atom-carbon atom bond in a molecule, and a second metal alkoxide containing two or more metal atom-carbon atom bonds in a molecule.

The present disclosure also relates to a method for producing magnetic particles including mixing cores made of a metal magnetic material, a first metal alkoxide containing no metal atom-carbon atom bond in a molecule, a second metal alkoxide containing two or more metal atom-carbon atom bonds in a molecule, and a solvent; and hydrolyzing and drying the first metal alkoxide and the second metal alkoxide to obtain magnetic particles, each including the core made of a metal magnetic material and a coating film which covers a surface of the core.

By using magnetic particles of the present disclosure, it is possible to produce a magnetic core having sufficiently higher relative permeability and specific resistance.

DETAILED DESCRIPTION

[Magnetic Particles]

Figure 1:
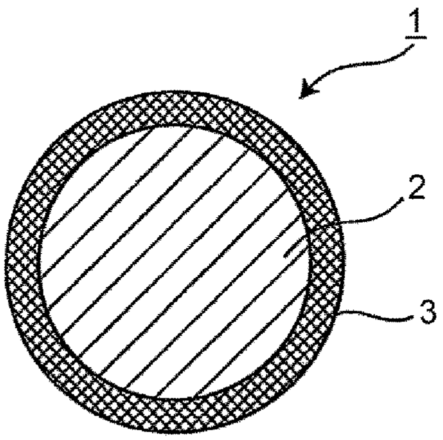
FIG. 1 is a schematic cross-sectional view showing a core of a magnetic particle of the present disclosure, and a coating film covering the core.

A magnetic particle according to the present disclosure is, as shown in FIG. 1, a magnetic particle 1 including a core 2 made of a metal magnetic material and a coating film 3 which covers a surface of the core 2. FIG. 1 is a schematic cross-sectional view showing a core of a magnetic particle of the present disclosure, and a coating film covering the core.

The term "core" refers to a particle of a metal magnetic material, and a surface thereof is covered with a coating film. The metal magnetic material is not particularly limited, but is preferably a soft magnetic material, in particular, a soft magnetic material containing iron. By using the soft magnetic material, a magnetic core having high magnetic flux density and high magnetic permeability can be obtained.

The soft magnetic material containing iron is not particularly limited, but for example, may be iron, an Fe—Si alloy, an Fe—Al alloy, an Fe—Ni alloy, an Fe—Co alloy, an Fe—Si—Al alloy, or an Fe—Si—Cr alloy.

The average particle size of the cores made of a metal magnetic material is not particularly limited, but for example, may be 0.01 μm or more and 300 μm or less (i.e., from 0.01 μm to 300 μm), and from the viewpoint of higher relative permeability and specific resistance, can be preferably 0.5 μm or more and 200 μm or less (i.e., from 0.5 μm to 200 μm), and more preferably 1 μm or more and 100 μm or less (i.e., from 1 μm to 100 μm).

The average particle size is determined using D50. D50 is a particle size at a point where the accumulated value is 50% in a cumulative curve of a particle size distribution obtained on the basis of volume, where the total volume is 100%.

In the present specification, the value measured with HELOS (H3190) & RODOS (manufactured by Sympatec) is used as the average particle size.

The coating film 3 is a layer which is also referred to as a “shell”, compared with the core 2, and is usually an electrical insulating coating film. The coating film contains a reaction product of a first metal alkoxide containing no metal atom-carbon atom bond in a molecule and a second metal alkoxide containing two or more metal atom-carbon atom bonds in a molecule, and for example, may be formed of a reaction product of the first metal alkoxide and the second metal alkoxide. The term “reaction product” usually refers to a sol-gel reaction product.

Figure 2:
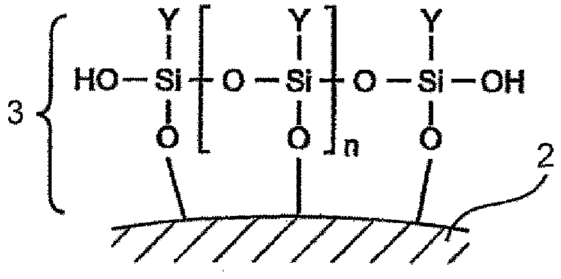
FIG. 2 is a schematic conceptual diagram showing a main bonding state at the interface between a coating film and a core in a magnetic particle of the present disclosure.
Figure 3:
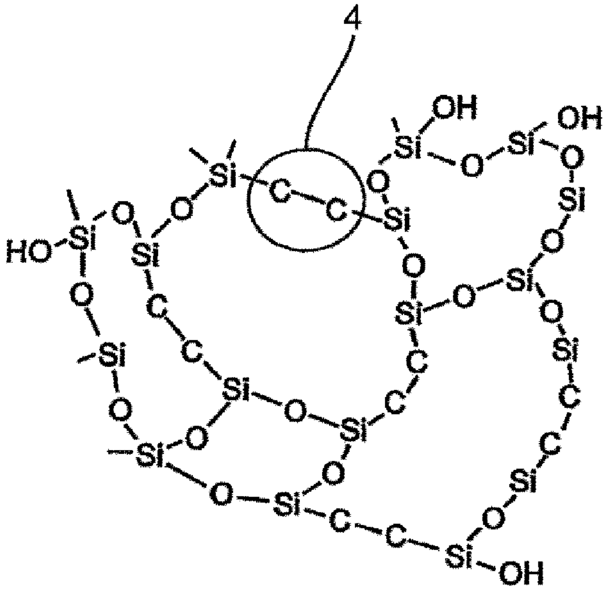
FIG. 3 is a schematic conceptual diagram showing a main structure of a coating film in a magnetic particle of the present disclosure.
Figure 6:
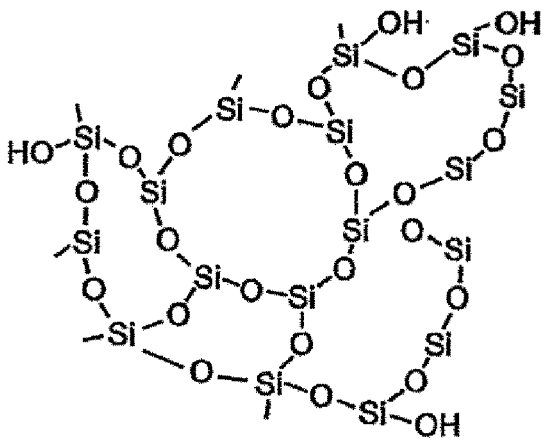
FIG. 6 is a schematic conceptual diagram showing a main structure of a coating film in an existing magnetic particle.

Specifically, the coating film does not have a stacked structure including a plurality of layers formed of the metal alkoxides, but has a network structure (single layer structure) formed of a reaction product of a mixture of the metal alkoxides. The first metal alkoxide has relatively high reactivity and, as shown in FIG. 2, at the interface between the coating film 3 and the core 2, mainly, fixes the coating film 3 to the core 2 by a relatively strong bond. On the other hand, the second metal alkoxide prevents formation of a dense network structure, forms the coating film 3 with a moderately coarse network structure having stress relaxation properties (or flexibility), and imparts slip properties to the surface of the coating film. More specifically, for example, in the case where the second metal alkoxide is a compound represented by the general formula (2A), which will be described later, it is considered that the “stress relaxation properties (or flexibility)”, “moderately coarse network structure”, and “slip properties” of the coating film 3 are provided by a divalent hydrocarbon group 4 possessed by the second metal alkoxide as shown in FIG. 3. For example, when a coating film has “stress relaxation properties (or flexibility)” and “a moderately coarse network structure”, the coating film has sufficient fracture resistance and is not easily fractured even by compression molding, and therefore the resulting magnetic core can have sufficiently higher specific resistance. Furthermore, for example, when the coating film has “slip properties”, magnetic particles do not easily adhere or cohere to each other and have sufficient filling performance during compression molding, and therefore the resulting magnetic core can have sufficiently higher relative permeability. Moreover, since the second metal alkoxide is incorporated into the coating film while being chemically bonded (specifically, covalently bonded) to the first metal alkoxide, unlike an additive that is incorporated simply by blending, the second metal alkoxide does not easily exude from the coating film to the outside thereof even if time elapses or the environment changes. Therefore, the sufficiently higher relative permeability and specific resistance obtained by the present disclosure can be continuously obtained even if time elapses or the environment changes. In the case where a coating film does not contain a component derived from the second metal alkoxide, for example, as shown in FIG. 6, the coating film has a relatively dense network structure and does not have “stress relaxation properties (or flexibility)” or “slip properties”, and therefore relative permeability and specific resistance are decreased. FIG. 2 is a schematic conceptual diagram showing a main bonding state at the interface between a coating film and a core in a magnetic particle of the present disclosure. FIG. 3 is a schematic conceptual diagram showing a main structure of a coating film in a magnetic particle of the present disclosure. FIG. 6 is a schematic conceptual diagram showing a main structure of a coating film in an existing magnetic particle. As shown in FIG. 3, the coating film 3 contains a metal atom not bonded to a carbon atom and a metal atom bonded to a carbon atom.

Note that the coating film 3 may be in direct contact with the surface of the core 2, or an insulating coating film may be separately arranged between the coating film 3 and the core 2.

The first metal alkoxide is a metal alkoxide containing no metal atom-carbon atom bond in a molecule, and all bonds of the metal are attached to alkoxy groups (-OW). The term “metal atom-carbon atom bond” refers to a direct covalent bond between a metal atom and a carbon atom. The carbon atom in the metal atom-carbon atom bond is a carbon atom that constitutes a monovalent hydrocarbon group (e.g., an alkyl group or alkenyl group) or a carbon atom that constitutes a divalent hydrocarbon group (e.g., an alkylene group). The first metal alkoxide has no such a metal atom-carbon atom bond in a molecule.

Specifically, the first metal alkoxide is a compound represented by the general formula (1) below or a mixture thereof.

$$M^1(OR^1)_x \quad (1)$$

In the formula (1), $M^1$ is a metal atom and is Li, Na, Mg, K, Ca, Cu, Sr, Y, Ba, Ce, Ta, Bi, Si, Ti, Al, or Zr, and preferably Si, Ti, Al, or Zr. From the viewpoint of higher relative permeability and specific resistance, $M^1$ is preferably Si, Ti, or Al, more preferably Si or Al, and still more preferably Si.

x is the valence of $M^1$ and is an integer of 1 to 4. When $M^1$ is Si, Ti, or Zr, x is 4. When $M^1$ is Al, x is 3.

$R^1$s are each independently an alkyl group having 1 to 10 carbon atoms or a group represented by the general formula: $—C(R^2)═CH—CO—R^3$ (in the formula, $R^2$ and $R^3$ are as described later), and from the viewpoint of higher relative permeability and specific resistance, preferably an alkyl group having 1 to 10 carbon atoms, and more preferably an alkyl group having 1 to 5 carbon atoms. Examples of the alkyl group as $R^1$ include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, an n-nonyl group, and an n-decyl group. Regarding a single or a plurality of $R^1$s corresponding to the number of x, all $R^1$s may be each independently selected from the alkyl groups described above, or all $R^1$s may be the same group selected from the alkyl groups described above.

$R^2$ is an alkyl group having 1 to 10 carbon atoms, and from the viewpoint of higher relative permeability and specific resistance, preferably an alkyl group having 1 to 5 carbon atoms. Examples of the alkyl group as $R^2$ are the same as those of the alkyl group as $R^1$.

$R^3$ is an alkyl group having 1 to 30 carbon atoms, an alkyloxy group having 1 to 30 carbon atoms, or an alkenyloxy group having 1 to 30 carbon atoms, and from the viewpoint of higher relative permeability and specific resistance, preferably an alkyl group having 1 to 20 carbon atoms (more preferably 1 to 10 carbon atoms, still more preferably 1 to 5 carbon atoms), an alkyloxy group having 10 to 30 (in particular, 14 to 24) carbon atoms, or an alkenyloxy group having 10 to 30 (in particular, 14 to 24) carbon atoms. Preferred examples of the alkyl group as $R^3$ include the same examples as those of the alkyl group as $R^1$ and also include an undecyl group, a lauryl group, a tridecyl group, a myristyl group, a pentadecyl group, a cetyl group, a heptadecyl group, a stearyl group, a nonadecyl group, and an eicosyl group. Examples of the alkyloxy group as $R^3$ include a group represented by the formula: $—O—C_pH_{2p+1}$ (in the formula, p is an integer of 1 to 30). Examples of the alkenyloxy group as $R^3$ include a group represented by the formula: $—O—C_qH_{2q-1}$ (in the formula, q is an integer of 1 to 30).

In the formula (1), among the plurality of $R^1$s, when two adjacent $R^1$s are alkyl groups, the two adjacent $R^1$s may be joined to each other to form a ring (e.g., a 5- to 8-membered ring, in particular, a 6-membered ring), together with the oxygen atoms to which the two $R^1$s are attached and the $M^1$ atom to which the oxygen atoms are attached. Examples of a ring formed by two adjacent $R^1$s joined to each other include a 6-membered ring represented by the general formula (1X) below.

(1X)

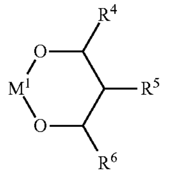

In the formula (1X), $R^4$, $R^5$, and $R^6$ are each independently a hydrogen atom or an alkyl group having 1 to 10 carbon atoms, and from the viewpoint of higher relative permeability and specific resistance, preferably a hydrogen atom or an alkyl group having 1 to 5 carbon atoms. The total number of carbon atoms of $R^4$, $R^5$, and $R^6$ is usually 0 to 12, and from the viewpoint of higher relative permeability and specific resistance, preferably 2 to 8. In the formula (1X), examples of the alkyl group as $R^4$, $R^5$, and $R^6$ are the same as those of the alkyl group as $R^1$.

Examples of the first metal alkoxide include compounds represented by the general formulae (1A), (1B), (1B'), (1C), and (1D) below. From the viewpoint of higher relative permeability and specific resistance, the first metal alkoxide is preferably a compound represented by the general formula (1A), (1B), (1C) or (1D) or a mixture thereof, more preferably a compound represented by the general formula (1A), (1B), or (1C) or a mixture thereof, still more preferably a compound represented by the general formula (1A) or (1C) or a mixture thereof, and particularly preferably a compound represented by the general formula (1A) or a mixture thereof.

$$Si(OR^1)_4 \qquad (1\text{A})$$

In the formula (1A), $R^1$s are each independently the same as $R^1$ in the formula (1). From the viewpoint of higher relative permeability and specific resistance, $R^1$s are each independently an alkyl group preferably having 1 to 10 carbon atoms, more preferably having 1 to 5 carbon atoms.

Specific examples of the compound (1A) represented by such a general formula are shown in the table below.

TABLE 1

Specific examples of compound (1A)

| Compound | $R^1$ | $R^1$ | $R^1$ | $R^1$ |
|---|---|---|---|---|
| 1A-1 | Ethyl group | Ethyl group | Ethyl group | Ethyl group |
| 1A-2 | Methyl group | Methyl group | Methyl group | Methyl group |
| 1A-3 | Butyl group | Butyl group | Butyl group | Butyl group |
| 1A-4 | Isopropyl group | Isopropyl group | Isopropyl group | Isopropyl group |
| 1A-5 | Ethyl group | Ethyl group | Ethyl group | Isopropyl group |

$$Ti(OR^1)_4 \qquad (1\text{B})$$

In the formula (1B), R's are each independently the same as $R^1$ in the formula (1). From the viewpoint of higher relative permeability and specific resistance, $R^1$s are each independently preferably an alkyl group having 1 to 10 carbon atoms or a group represented by the general formula: $—C(R^2)═CH—CO—R^3$ (in the formula, $R^2$ and $R^3$ are the same as $R^2$ and $R^3$ described in the general formula (1)), and more preferably an alkyl group having 1 to 10 (in particular, 1 to 5) carbon atoms.

In the formula (1B), from the viewpoint of higher relative permeability and specific resistance, $R^2$ and $R^3$ are each preferably the following group. $R^2$ is an alkyl group having 1 to 10 carbon atoms, and preferably an alkyl group having 1 to 5 carbon atoms. Examples of the alkyl group as $R^2$ are the same as those of the alkyl group as $R^1$. $R^3$ is an alkyl group having 1 to 30 carbon atoms, and preferably an alkyl group having 1 to 20 carbon atoms (more preferably 1 to 10 carbon atoms, still more preferably 1 to 5 carbon atoms). Preferred examples of the alkyl group as $R^3$ include the same examples as those of the alkyl group as $R^1$ and also include an undecyl group, a lauryl group, a tridecyl group, a myristyl group, a pentadecyl group, a cetyl group, a heptadecyl group, a stearyl group, a nonadecyl group, and an eicosyl group.

Specific examples of the compound (1B) represented by such a general formula are shown in the table below.

TABLE 2

Specific examples of compound (1B)

| Compound | $R^1$ | $R^1$ | $R^1$ | $R^1$ |
|---|---|---|---|---|
| 1B-1 | Butyl group | Butyl group | Butyl group | Butyl group |
| 1B-2 | Isopropyl group | Isopropyl group | Isopropyl group | Isopropyl group |
| 1B-3 | Ethyl group | Ethyl group | Ethyl group | Ethyl group |
| 1B-4 | Methyl group | Methyl group | Methyl group | Methyl group |

TABLE 2-continued

| Specific examples of compound (1B) | | | | |
|---|---|---|---|---|
| Compound | $R^1$ | $R^1$ | $R^1$ | $R^1$ |
| 1B-5 | Isopropyl group | Isopropyl group | $-C(CH_3)=CH-CO-CH_3$ | $-C(CH_3)=CH-CO-CH_3$ |
| 1B-6 | Isopropyl group | Isopropyl group | $-C(CH_3)=CH-CO-C_2H_5$ | $-C(CH_3)=CH-CO-C_2H_5$ |
| 1B-7 | Butyl group | Butyl group | $-C(CH_3)=CH-CO-CH_3$ | $-C(CH_3)=CH-CO-CH_3$ |
| 1B-8 | Butyl group | Butyl group | $-C(CH_3)=CH-CO-C_2H_5$ | $-C(CH_3)=CH-CO-C_2H_5$ |
| 1B-9 | Ethyl group | Ethyl group | $-C(CH_3)=CH-CO-CH_3$ | $-C(CH_3)=CH-CO-CH_3$ |
| 1B-10 | Ethyl group | Ethyl group | $-C(CH_3)=CH-CO-C_2H_5$ | $-C(CH_3)=CH-CO-C_2H_5$ |
| 1B-11 | Methyl group | Methyl group | $-C(CH_3)=CH-CO-CH_3$ | $-C(CH_3)=CH-CO-CH_3$ |
| 1B-12 | Methyl group | Methyl group | $-C(CH_3)=CH-CO-C_2H_5$ | $-C(CH_3)=CH-CO-C_2H_5$ |

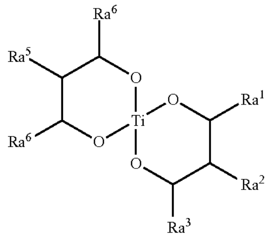

(1B')

In the formula (1B'), $Ra^1$, $Ra^2$, $Ra^3$, $Ra^4$, $Ra^5$, and $Ra^6$ are each independently a hydrogen atom or an alkyl group having 1 to 10 carbon atoms, and from the viewpoint of higher relative permeability and specific resistance, preferably an alkyl group having 1 to 5 carbon atoms. Examples of the alkyl group as $Ra^1$, $Ra^2$, $Ra^3$, $Ra^4$, $Ra^5$, and $Ra^6$ are the same as those of the alkyl group as $R^1$.

A specific example of the compound (1B') represented by such a general formula is shown in the table below.

TABLE 3

| Specific example of compound (1B') | | | | | | |
|---|---|---|---|---|---|---|
| Compound | $Ra^1$ | $Ra^2$ | $Ra^3$ | $Ra^4$ | $Ra^5$ | $Ra^6$ |
| 1B'-1 | n-Propyl group | Ethyl group | Hydrogen atom | n-Propyl group | Ethyl group | Hydrogen atom |

$$Al(OR^1)_3 \quad (1C)$$

In the formula (1C), $R^1$s are each independently the same as $R^1$ in the formula (1). From the viewpoint of higher relative permeability and specific resistance, $R^1$s are each independently preferably an alkyl group having 1 to 10 carbon atoms or a group represented by the general formula: $-C(R^2)=CH-CO-R^3$ (in the formula, $R^2$ and $R^3$ are the same as $R^2$ and $R^3$ described in the general formula (1)), and more preferably an alkyl group having 1 to 10 (in particular, 1 to 5) carbon atoms.

In the formula (1C), from the viewpoint of higher relative permeability and specific resistance, $R^2$ and $R^3$ are each preferably the following group. $R^2$ is an alkyl group having 1 to 10 carbon atoms, and preferably an alkyl group having 1 to 5 carbon atoms. Examples of the alkyl group as $R^2$ are the same as those of the alkyl group as $R^1$. $R^3$ is an alkyloxy group having 1 to 30 carbon atoms or an alkenyloxy group having 1 to 30 carbon atoms, and preferably an alkyloxy group having 10 to 30 (in particular, 14 to 24) carbon atoms or an alkenyloxy group having 10 to 30 (in particular, 14 to 24) carbon atoms. Examples of the alkyloxy group as $R^3$ include a group represented by the formula: $-O-C_pH_{2p+1}$ (in the formula, p is an integer of 1 to 30). Examples of the alkenyloxy group as $R^3$ include a group represented by the formula: $-O-C_qH_{2q-1}$ (in the formula, q is an integer of 1 to 30).

Specific examples of the compound (1C) represented by such a general formula are shown in the table below.

TABLE 4

| Specific examples of compound (1C) | | | |
|---|---|---|---|
| Compound | $R^1$ | $R^1$ | $R^1$ |
| 1C-1 | Isopropyl group | Isopropyl group | Isopropyl group |
| 1C-2 | Sec-butyl group | Sec-butyl group | Sec-butyl group |
| 1C-3 | Ethyl group | Ethyl group | Ethyl group |
| 1C-4 | Methyl group | Methyl group | Methyl group |
| 1C-5 | Isopropyl group | Isopropyl group | $-C(CH_3)=CO-C_{18}H_{35}$ |
| 1C-6 | Isopropyl group | Isopropyl group | $-C(CH_3)=CO-C_{18}H_{37}$ |
| 1C-7 | Sec-butyl group | Sec-butyl group | $-C(CH_3)=CO-C_{18}H_{35}$ |
| 1C-8 | Sec-butyl group | Sec-butyl group | $-C(CH_3)=CO-C_{18}H_{37}$ |
| 1C-9 | Ethyl group | Ethyl group | $-C(CH_3)=CO-C_{18}H_{35}$ |
| 1C-10 | Ethyl group | Ethyl group | $-C(CH_3)=CO-C_{18}H_{37}$ |
| 1C-11 | Methyl group | Methyl group | $-C(CH_3)=CO-C_{18}H_{35}$ |
| 1C-12 | Methyl group | Methyl group | $-C(CH_3)=CO-C_{18}H_{37}$ |

$$Zr(OR^1)_4 \quad (1D)$$

In the formula (1D), $R^1$s are each independently the same as $R^1$ in the formula (1). From the viewpoint of higher relative permeability and specific resistance, $R^1$s are each independently an alkyl group preferably having 1 to 10 carbon atoms, more preferably having 1 to 5 carbon atoms.

Specific examples of the compound (1D) represented by such a general formula are shown in the table below.

TABLE 5

| Specific examples of compound (1D) | | | | |
|---|---|---|---|---|
| Compound | $R^1$ | $R^1$ | $R^1$ | $R^1$ |
| 1D-1 | Isopropyl group | Isopropyl group | Isopropyl group | Isopropyl group |
| 1D-2 | Butyl group | Butyl group | Butyl group | Butyl group |
| 1D-3 | Ethyl group | Ethyl group | Ethyl group | Ethyl group |
| 1D-4 | Methyl group | Methyl group | Methyl group | Methyl group |
| 1D-5 | Methyl group | Methyl group | Methyl group | Isopropyl group |

The compound (1) represented by the general formula (1) can be obtained as a commercial product or can be produced by a known method.

For example, the compound (1A) can be obtained as tetraethyl orthosilicate (manufactured by Tokyo Chemical Industry Co., Ltd.), which is a commercial product.

For example, the compound (1B) can be obtained as tetrabutyl orthotitanate (manufactured by Tokyo Chemical Industry Co., Ltd.), titanium tetraisopropoxide (manufactured by Tokyo Chemical Industry Co., Ltd.), and T-50 (manufactured by Nippon Soda Co., Ltd.), which are commercial products.

For example, the compound (1B') can be obtained as TOG (manufactured by Nippon Soda Co., Ltd.), which is a commercial product.

For example, the compound (1C) can be obtained as aluminum triisopropoxide (manufactured by Kanto Chemical Co., Inc.), which is a commercial product.

For example, the compound (1D) can be obtained as zirconium (IV) tetrabutoxide (trade name: TBZR, manufactured by Nippon Soda Co., Ltd.), zirconium tetraisopropoxide (manufactured by Tokyo Chemical Industry Co., Ltd.), and ZR-181 (manufactured by Nippon Soda Co., Ltd.), which are commercial products.

The mixing amount of the first metal alkoxide required to obtain the coating film 3 (i.e., a reaction product constituting the coating film) is usually 5% by weight or more and 95% by weight or less (i.e., from 5% by weight to 95% by weight) relative to the total weight of the metal alkoxides mixed (for example, the total weight of the first metal alkoxide and the second metal alkoxide), and from the viewpoint of higher relative permeability and specific resistance, is preferably 20% by weight or more and 80% by weight or less (i.e., from 20% by weight to 80% by weight), more preferably 30% by weight or more and 80% by weight or less (i.e., from 30% by weight to 80% by weight), still more preferably 40% by weight or more and 80% by weight or less (i.e., from 40% by weight to 80% by weight), and particularly preferably 50% by weight or more and 75% by weight or less (i.e., from 50% by weight to 75% by weight). Note that the weight ratio (% by weight) is a ratio where the total weight of the first metal alkoxide and the second metal alkoxide is 100% by weight. The coating film may be produced using two or more first metal alkoxides, and in this case, the total amount thereof is within the range described above. The mixing amount of the first metal alkoxide required to obtain the coating film 3 may be the ratio of the mixing amount of the first metal alkoxide to the total mixing amount of the first metal alkoxide and the second metal alkoxide.

The second metal alkoxide is a metal alkoxide containing two or more (e.g., two or more and 20 or less (i.e., from two to 20), in particular, two or more and 12 or less (i.e., from two to 12)) metal atom-carbon atom bonds in a molecule. In the second metal alkoxide, the carbon atom constituting the two or more metal atom-carbon atom bonds is a carbon atom constituting a monovalent hydrocarbon group (e.g., an alkyl group or alkenyl group) and/or a carbon atom constituting a divalent hydrocarbon group (e.g., an alkylene group). In the second metal alkoxide, the carbon atom constituting all of the two or more metal atom-carbon atom bonds is preferably a carbon atom constituting a divalent hydrocarbon group (e.g., an alkylene group) from the viewpoint of higher relative permeability and specific resistance. The metal atom of the second metal alkoxide is Li, Na, Mg, K, Ca, Cu, Sr, Y, Ba, Ce, Ta, Bi, Si, Ti, Al, or Zr, preferably Si, Ti, Al, or Zr, more preferably Si, Ti, or Al, still more preferably Si or Al, and particularly preferably Si. The second metal alkoxide contains two or more such metal atom-carbon atom bonds in a molecule.

In the case where the carbon atom constituting the metal atom-carbon atom bond in the second metal alkoxide is a carbon atom constituting a divalent hydrocarbon group, the second metal alkoxide is a compound that has two or more groups represented by the following general formula (2) (e.g., trialkoxysilyl groups) in a molecule.

$$-M^2(OR^{21}) \quad (2)$$

In the formula (2), $M^2$ is a metal atom and is Li, Na, Mg, K, Ca, Cu, Sr, Y, Ba, Ce, Ta, Bi, Si, Ti, Al, or Zr, preferably Si, Ti, Al, or Zr, more preferably Si, Ti, or Al, still more preferably Si or Al, and particularly preferably Si.

y is the valence of $M^2$. When $M^2$ is Si, Ti, or Zr, y is 3. When $M^2$ is Al, y is 2.

$R^{21}$s are each independently an alkyl group having 1 to 10 carbon atoms, and from the viewpoint of higher relative permeability and specific resistance, preferably an alkyl group having 1 to 5 carbon atoms, and more preferably an alkyl group having 1 to 3 carbon atoms. Examples of such an alkyl group include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, an n-nonyl group, and an n-decyl group. Regarding a plurality of $R^{21}$s, all $R^{21}$s may be each independently selected from the alkyl groups described above, or all $R^{21}$s may be the same group selected from the alkyl groups described above.

The two or more groups represented by the general formula (2) (e.g., trialkoxysilyl groups) of the second metal alkoxide may be each independently selected from the group represented by the general formula (2) (e.g., a trialkoxysilyl group), or may be the same group.

Specific examples of the group represented by such a general formula (2) (e.g., a trialkoxysilyl group) are shown in the table below.

TABLE 6

Specific examples of group represented by general formula (2)

| Group | $M^2$ | y | $R^{21}$ | $R^{21}$ | $R^{21}$ |
|---|---|---|---|---|---|
| 2A-1 | Si | 3 | Methyl group | Methyl group | Methyl group |
| 2A-2 | Si | 3 | Ethyl group | Ethyl group | Ethyl group |
| 2A-3 | Si | 3 | Isopropyl group | Isopropyl group | Isopropyl group |
| 2A-4 | Si | 3 | Butyl group | Butyl group | Butyl group |
| 2A-5 | Si | 3 | Methyl group | Methyl group | Isopropyl group |

In the case where the carbon atom constituting all of the two or more metal atom-carbon atom bonds in the second metal alkoxide is a carbon atom constituting a divalent hydrocarbon group, the second metal alkoxide may be, for example, a compound represented by the general formula (2A), (2B), (2C), (2E), or (2F) below or a mixture thereof. Among these, from the viewpoint of higher relative permeability and specific resistance, the second metal alkoxide is preferably a compound represented by the general formula (2A), (2B), or (2C) or a mixture thereof, more preferably a compound represented by the general formula (2A) or (2B) or a mixture thereof, and still more preferably a compound represented by the general formula (2A).

In the case where the carbon atom constituting all of the two or more metal atom-carbon atom bonds in the second metal alkoxide is a carbon atom constituting a monovalent hydrocarbon group, the second metal alkoxide may be, for example, a compound represented by the general formula (2D) below or a mixture thereof.

$$(R^{211}O)_3Si—R^{31}—Si(OR^{212})_3 \quad (2\,A)$$

In the formula (2A), $R^{211}$ and $R^{212}$ are each independently the same group as $R^{21}$ in the formula (2). Specifically, three $R^{211}$s and three $R^{212}$s are each independently an alkyl group having 1 to 10 carbon atoms, and from the viewpoint of higher relative permeability and specific resistance, preferably an alkyl group having 1 to 5 carbon atoms, and more preferably an alkyl group having 1 to 3 carbon atoms. Three $R^{211}$s and three $R^{212}$s may be each independently selected from $R^{21}$ in the general formula (2), or may be the same group.

$R^{31}$ is a divalent hydrocarbon group having 1 to 20 carbon atoms, and from the viewpoint of higher relative permeability and specific resistance, preferably a divalent hydrocarbon group having 1 to 10 carbon atoms, more preferably a divalent hydrocarbon group having 2 to 8 carbon atoms, still more preferably a divalent hydrocarbon group having 3 to 7 carbon atoms, particularly preferably a divalent hydrocarbon group having 4 to 7 carbon atoms, and most preferably a divalent hydrocarbon group having 5 to 7 carbon atoms. $R^{31}$ may be a branched-chain hydrocarbon group, and is preferably a straight-chain hydrocarbon group. The divalent hydrocarbon group as $R^{31}$ may be a divalent saturated aliphatic hydrocarbon group (e.g., an alkylene group), or may be a divalent unsaturated aliphatic hydrocarbon group (e.g., an alkenylene group). From the viewpoint of higher relative permeability and specific resistance, the divalent hydrocarbon group as $R^{31}$ is preferably a divalent saturated aliphatic hydrocarbon group (in particular, an alkylene group). Examples of the divalent saturated aliphatic hydrocarbon group (in particular, an alkylene group) as $R^{31}$ include a group represented by $—(CH_2)_p—$ (in the formula, p is an integer of 1 to 10, more preferably 2 to 8, still more preferably 3 to 7, particularly preferably 4 to 7, and most preferably 5 to 7).

Specific examples of the compound (2A) represented by such a general formula are shown in the table below.

TABLE 7

| Specific examples of compound (2A) | | | | | | | |
|---|---|---|---|---|---|---|---|
| Compound | $R^{211}$ | $R^{211}$ | $R^{211}$ | $R^{31}$ | $R^{212}$ | $R^{212}$ | $R^{212}$ |
| 2A-1 | Methyl group | Methyl group | Methyl group | $—CH_2CH_2—$ | Methyl group | Methyl group | Methyl group |
| 2A-2 | Methyl group | Methyl group | Methyl group | $—CH_2CH_2CH_2CH_2CH_2CH_2—$ | Methyl group | Methyl group | Methyl group |
| 2A-3 | Ethyl group | Ethyl group | Ethyl group | $—CH_2CH_2—$ | Ethyl group | Ethyl group | Ethyl group |
| 2A-4 | Ethyl group | Ethyl group | Ethyl group | $—CH_2CH_2CH_2CH_2CH_2CH_2—$ | Ethyl group | Ethyl group | Ethyl group |
| 2A-5 | Methyl group | Methyl group | Butyl group | $—CH_2CH_2—$ | Methyl group | Methyl group | Butyl group |

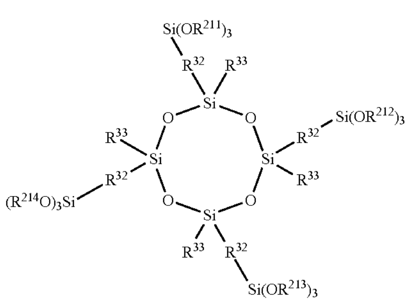

(2B)

In the formula (2B), $R^{211}$, $R^{212}$, $R^{213}$, and $R^{214}$ are each the same group as $R^{21}$ in the formula (2). Specifically, three $R^{211}$s, three $R^{212}$s, three $R^{213}$s, and three $R^{214}$s are each independently an alkyl group having 1 to 10 carbon atoms, and from the viewpoint of higher relative permeability and specific resistance, preferably an alkyl group having 1 to 5 carbon atoms, and more preferably an alkyl group having 1 to 3 carbon atoms. Three $R^{211}$s, three $R^{212}$s, three $R^{213}$s, and three $R^{214}$s may be each independently selected from $R^{21}$ in the general formula (2), or may be the same group.

$R^{32}$s are each independently a divalent hydrocarbon group having 1 to 20 carbon atoms, and from the viewpoint of higher relative permeability and specific resistance, preferably a divalent hydrocarbon group having 1 to 10 carbon atoms, and more preferably a divalent hydrocarbon group having 6 to 10 carbon atoms. The divalent hydrocarbon group as $R^{32}$ may be a divalent saturated aliphatic hydrocarbon group (e.g., an alkylene group), or may be a divalent unsaturated aliphatic hydrocarbon group (e.g., an alkenylene group). From the viewpoint of higher relative permeability and specific resistance, the divalent hydrocarbon group as $R^{32}$ is preferably a divalent saturated aliphatic hydrocarbon group (in particular, an alkylene group). Examples of the divalent saturated aliphatic hydrocarbon group (in particular, an alkylene group) as $R^{32}$ include a group represented by $—(CH2)_q—$ (in the formula, q is an integer of 1 to 10, and more preferably 6 to 10). All $R^{32}$s may be each independently selected from the $R^{32}$, or may be the same group.

$R^{33}$s are each independently a monovalent hydrocarbon group having 1 to 10 carbon atoms, and from the viewpoint of higher relative permeability and specific resistance, preferably a monovalent hydrocarbon group having 1 to 5 carbon atoms, and more preferably a monovalent hydrocarbon group having 1 to 3 carbon atoms. The monovalent hydrocarbon group as $R^{33}$ may be a saturated aliphatic hydrocarbon group (e.g., an alkyl group), or may be an unsaturated aliphatic hydrocarbon group (e.g., an alkenyl group). From the viewpoint of higher relative permeability and specific resistance, the monovalent hydrocarbon group as $R^{33}$ is preferably a saturated aliphatic hydrocarbon group (in particular, an alkyl group). Examples of the monovalent saturated aliphatic hydrocarbon group (in particular, an alkyl group) as $R^{33}$ include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, an n-nonyl group, and an n-decyl group. All $R^{33}$s may be each independently selected from the $R^{33}$, or may be the same group.

Specific examples of the compound (2B) represented by such a general formula are shown in the table below.

TABLE 8

| Specific examples of compound (2B) | | | |
|---|---|---|---|
| Compound | Three $R^{211}$s, three $R^{212}$s, three $R^{213}$s, three $R^{214}$s | Four $R^{32}$s | Four $R^{33}$s |
| 2B-1 | Methyl group | $—CH_2CH_2CH_2CH_2CH_2CH_2CH_2CH_2—$ | Methyl group |
| 2B-2 | Ethyl group | $—CH_2CH_2CH_2CH_2CH_2CH_2CH_2CH_2—$ | Methyl group |

$$R^{211}O)_8Si—R^{24}—NH—R^{35}NH—R^{36}—Si(OR^{212})_3 \quad (2C)$$

In the formula (2C), $R^{211}$ and $R^{212}$ are each the same group as $R^{21}$ in the formula (2). Specifically, three $R^{211}$s and three $R^{212}$s are each independently an alkyl group having 1 to 10 carbon atoms, and from the viewpoint of higher relative permeability and specific resistance, preferably an alkyl group having 1 to 5 carbon atoms, and more preferably an alkyl group having 1 to 3 carbon atoms. Three $R^{211}$s and three $R^{212}$s may be each independently selected from $R^{21}$ in the general formula (2), or may be the same group.

$R^{34}$, $R^{35}$, and $R^{36}$ are each independently a divalent hydrocarbon group having 1 to 10 carbon atoms, and from the viewpoint of higher relative permeability and specific resistance, preferably a divalent hydrocarbon group having 1 to 5 carbon atoms. The divalent hydrocarbon group as $R^{34}$, $R^{35}$, and $R^{36}$ may be a divalent saturated aliphatic hydrocarbon group (e.g., an alkylene group), or may be a divalent unsaturated aliphatic hydrocarbon group (e.g., an alkenylene group). From the viewpoint of higher relative permeability and specific resistance, the divalent hydrocarbon group as $R^{34}$, $R^{35}$, and $R^{36}$ is preferably a divalent saturated aliphatic hydrocarbon group (in particular, an alkylene group). Examples of the divalent saturated aliphatic hydrocarbon group (in particular, an alkylene group) as $R^{34}$, $R^{35}$, and $R^{36}$ include a group represented by $—(CH_2)_r—$ (in the formula, r is an integer of 1 to 10, and more preferably 1 to 5). All of $R^{34}$, $R^{35}$, and $R^{36}$ may be each independently selected from the divalent hydrocarbon group, or may be the same group. The total number of carbon atoms of $R^{34}$, $R^{35}$, and $R^{36}$ is, from the viewpoint of higher relative permeability and specific resistance, preferably 3 to 20, and more preferably 6 to 10.

Specific examples of the compound (2C) represented by such a general formula are shown in the table below.

TABLE 9

| Specific examples of compound (2C) | | | | |
|---|---|---|---|---|
| Compound | Three $R^{211}$s, three $R^{212}$s | $R^{34}$ | $R^{35}$ | $R^{36}$ |
| 2C-1 | Methyl group | $—CH_2CH_2CH_2—$ | $—CH_2CH_2—$ | $—CH_2CH_2CH_2—$ |
| 2C-2 | Ethyl group | $—CH_2CH_2CH_2—$ | $—CH_2CH_2—$ | $—CH_2CH_2CH_2—$ |

$$(R^{211})_2—Si(OR^{212})_2 \quad (2D)$$

In the formula (2D), $R^{211}$ and $R^{212}$ are each independently the same group as $R^{21}$ in the formula (2). Specifically, two $R^{211}$s and two $R^{212}$s are each independently an alkyl group having 1 to 10 carbon atoms, and from the viewpoint of higher relative permeability and specific resistance, preferably an alkyl group having 1 to 5 carbon atoms, and more preferably an alkyl group having 1 to 3 carbon atoms. Two $R^{211}$s and two $R^{212}$s may be each independently selected from $R^{21}$ in the general formula (2), or may be the same group.

Specific examples of the compound (2D) represented by such a general formula are shown in the table below.

TABLE 10

| Specific examples of compound (2D) | | |
|---|---|---|
| Compound | Two $R^{211}$s | Two $R^{212}$s |
| 2D-1 | Methyl group | Methyl group |
| 2D-2 | Methyl group | Ethyl group |

(2E)

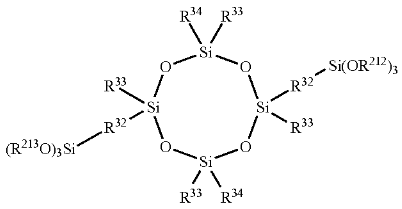

In the formula (2E), $R^{212}$ and $R^{213}$ are each the same group as $R^{21}$ in the formula (2). Specifically, three $R^{212}$s and three $R^{213}$s are each independently an alkyl group having 1 to 10 carbon atoms, and from the viewpoint of higher relative permeability and specific resistance, preferably an alkyl group having 1 to 5 carbon atoms, and more preferably an alkyl group having 1 to 3 carbon atoms. Three $R^{212}$s and three $R^{213}$s may be each independently selected from $R^{21}$ in the general formula (2), or may be the same group.

$R^{32}$s are each independently a divalent hydrocarbon group having 1 to 20 carbon atoms, and from the viewpoint of higher relative permeability and specific resistance, preferably a divalent hydrocarbon group having 1 to 10 carbon atoms, and more preferably a divalent hydrocarbon group having 4 to 8 carbon atoms. The divalent hydrocarbon group as $R^{32}$ may be a divalent saturated aliphatic hydrocarbon group (e.g., an alkylene group), or may be a divalent unsaturated aliphatic hydrocarbon group (e.g., an alkenylene group). From the viewpoint of higher relative permeability and specific resistance, the divalent hydrocarbon group as $R^{32}$ is preferably a divalent saturated aliphatic hydrocarbon group (in particular, an alkylene group). Examples of the divalent saturated aliphatic hydrocarbon group (in particular, an alkylene group) as $R^{32}$ include a group represented by $-(CH_2)_q-$ (in the formula, q is an integer of 1 to 20, preferably 1 to 10, and more preferably 4 to 8). All $R^{32}$s may be each independently selected from the $R^{32}$, or may be the same group.

$R^{33}$s are each independently a monovalent hydrocarbon group having 1 to 10 carbon atoms, and from the viewpoint of higher relative permeability and specific resistance, preferably a monovalent hydrocarbon group having 1 to 5 carbon atoms, and more preferably a monovalent hydrocarbon group having 1 to 3 carbon atoms. The monovalent hydrocarbon group as $R^{33}$ may be a saturated aliphatic hydrocarbon group (e.g., an alkyl group), or may be an unsaturated aliphatic hydrocarbon group (e.g., an alkenyl group). From the viewpoint of higher relative permeability and specific resistance, the monovalent hydrocarbon group as $R^{33}$ is preferably a saturated aliphatic hydrocarbon group (in particular, an alkyl group). Examples of the monovalent saturated aliphatic hydrocarbon group (in particular, an alkyl group) as $R^{33}$ include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, an n-nonyl group, and an n-decyl group. All $R^{33}$s may be each independently selected from the $R^{33}$, or may be the same group.

$R^{34}$s are each independently a monovalent hydrocarbon group having 1 to 30 carbon atoms, and from the viewpoint of higher relative permeability and specific resistance, preferably a monovalent hydrocarbon group having 1 to 10 carbon atoms, and more preferably a monovalent hydrocarbon group having 1 to 5 carbon atoms. The monovalent hydrocarbon group as $R^{34}$ may be a saturated aliphatic hydrocarbon group (e.g., an alkyl group), or may be an unsaturated aliphatic hydrocarbon group (e.g., an alkenyl group). From the viewpoint of higher relative permeability and specific resistance, the monovalent hydrocarbon group as $R^{34}$ is preferably a saturated aliphatic hydrocarbon group (in particular, an alkyl group). Examples of the monovalent saturated aliphatic hydrocarbon group (in particular, an alkyl group) as $R^{34}$ include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an eicosyl group. All $R^{34}$s may be each independently selected from the $R^{34}$, or may be the same group.

Specific examples of the compound (2E) represented by such a general formula are shown in the table below.

TABLE 11

| Specific examples of compound (2E) | | | | |
|---|---|---|---|---|
| Compound | Three $R^{212}$s, Three $R^{213}$s | Two $R^{32}$s | Four $R^{33}$s | Two $R^{34}$s |
| 2E-1 | Methyl group | $-CH_2CH_2CH_2CH_2CH_2CH_2-$ | Methyl group | Ethyl group |
| 2E-2 | Ethyl group | $-CH_2CH_2CH_2CH_2CH_2CH_2-$ | Methyl group | Ethyl group |

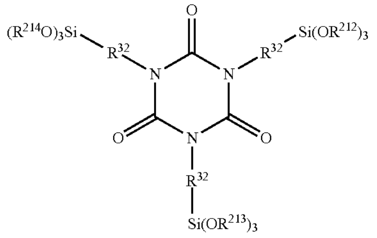

(2F)

In the formula (2F), $R^{212}$, $R^{213}$, and $R^{214}$ are each independently the same group as $R^{21}$ in the formula (2). Specifically, three $R^{212}$s, three $R^{213}$s, and three $R^{214}$s are each independently an alkyl group having 1 to 10 carbon atoms, and from the viewpoint of higher relative permeability and specific resistance, preferably an alkyl group having 1 to 5 carbon atoms, and more preferably an alkyl group having 1 to 3 carbon atoms. Three $R^{212}$s, three $R^{213}$s, and three $R^{214}$s may be each independently selected from $R^{21}$ in the general formula (2), or may be the same group.

$R^{32}$s are each independently a divalent hydrocarbon group having 1 to 20 carbon atoms, and from the viewpoint of higher relative permeability and specific resistance, preferably a divalent hydrocarbon group having 1 to 10 carbon atoms, and more preferably a divalent hydrocarbon group having 1 to 5 carbon atoms. The divalent hydrocarbon group as $R^{32}$ may be a divalent saturated aliphatic hydrocarbon group (e.g., an alkylene group), or may be a divalent unsaturated aliphatic hydrocarbon group (e.g., an alkenylene group). From the viewpoint of higher relative permeability and specific resistance, the divalent hydrocarbon group as $R^{32}$ is preferably a divalent saturated aliphatic hydrocarbon group (in particular, an alkylene group). Examples of the divalent saturated aliphatic hydrocarbon group (in particular, an alkylene group) as $R^{32}$ include a group represented by $-(CH_2)_q-$ (in the formula, q is an integer of 1 to 10, and more preferably 1 to 5). All $R^{32}$s may be each independently selected from the $R^{32}$, or may be the same group.

Specific examples of the compound (2F) represented by such a general formula are shown in the table below.

TABLE 12

| Specific examples of compound (2F) | | | | |
|---|---|---|---|---|
| Compound | Three $R^{212}$s | Three $R^{213}$s | Three $R^{214}$s | Three $R^{32}$s |
| 2F-1 | Methyl group | Methyl group | Methyl group | $-CH_2CH_2CH_2-$ |
| 2F-2 | Ethyl group | Ethyl group | Ethyl group | $-CH_2CH_2CH_2-$ |

The compound (2A) represented by the general formula (2A), the compound (2B) represented by the general formula (2B), the compound (2C) represented by the general formula (2C), the compound (2D) represented by the general formula (2D), the compound (2E) represented by the general formula (2E), and the compound (2F) represented by the general formula (2F) can be obtained as commercial products or can be produced by known methods.

For example, the compound (2A) can be obtained as 1,1-bis(trimethoxysilyl)methane (manufactured by Tokyo Chemical Industry Co., Ltd.), 1,2-bis(trimethoxysilyl)ethane (manufactured by Tokyo Chemical Industry Co., Ltd.), 1,6-bis(trimethoxysilyl)hexane (manufactured by Tokyo Chemical Industry Co., Ltd.), 1,8-bis(trimethoxysilyl)octane (manufactured by Shin-Etsu Chemical Co., Ltd.), and 1,10-bis(trimethoxysilyl)decane (manufactured by Gelest, Inc.), which are commercial products.

For example, the compound (2C) can be obtained as X-12-5263HP (manufactured by Shin-Etsu Chemical Co., Ltd.), which is a commercial product.

For example, the compound (2D) can be obtained as dimethyldimethoxysilane (manufactured by Tokyo Chemical Industry Co., Ltd.), which is a commercial product.

For example, the compound (2F) can be obtained as tris[3-(trimethoxysilyl)-propyl]isocyanurate (manufactured by Tokyo Chemical Industry Co., Ltd.), which is a commercial product.

The second metal alkoxide may be, for example, a compound represented by the general formula (2A), (2B), (2C), (2D), (2E), or (2F) or a mixture thereof. From the viewpoint of higher relative permeability and specific resistance, the second metal alkoxide is preferably a compound represented by the general formula (2A) or a mixture thereof.

The mixing amount of the second metal alkoxide required to obtain the coating film 3 (i.e., a reaction product constituting the coating film) is usually 5% by weight or more and 95% by weight or less (i.e., from 5% by weight to 95% by weight) relative to the total weight of the metal alkoxides mixed (for example, the total weight of the first metal alkoxide and the second metal alkoxide), and from the viewpoint of higher relative permeability and specific resistance, is preferably 20% by weight or more and 80% by weight or less (i.e., from 20% by weight to 80% by weight), more preferably 20% by weight or more and 70% by weight or less (i.e., from 20% by weight to 70% by weight), still more preferably 20% by weight or more and 60% by weight or less (i.e., from 20% by weight to 60% by weight), and particularly preferably 25% by weight or more and 50% by weight or less (i.e., from 25% by weight to 50% by weight). Note that the weight ratio (% by weight) is a ratio where the total weight of the first metal alkoxide and the second metal alkoxide is 100% by weight. The coating film may be produced using two or more second metal alkoxides, and in this case, the total amount thereof is within the range described above. The mixing amount of the second metal alkoxide required to obtain the coating film 3 may be the ratio of the mixing amount of the second metal alkoxide to the total mixing amount of the first metal alkoxide and the second metal alkoxide.

A coating film 3 may be produced using a third metal alkoxide. Specifically, a coating film 3 may be produced using or without using a third metal alkoxide. In the case where a coating film 3 is produced using a third metal alkoxide, the coating film 3 contains a reaction product of a first metal alkoxide, a second metal alkoxide, and a third metal alkoxide, and for example, may be formed of a reaction product of the first metal alkoxide, the second metal alkoxide, and the third metal alkoxide.

The third metal alkoxide is a metal alkoxide that contains only one metal atom-carbon atom bond in a molecule, and for example, is an alkoxide compound in which one of the bonds of the metal is attached to a monovalent hydrocarbon group (—$R^{12}$), and all remaining bonds are attached to alkoxy groups (—$OR^{11}$). In the third metal alkoxide, the term "metal atom-carbon atom bond" refers to a direct covalent bond between a metal atom and a carbon atom. In the third metal alkoxide, the carbon atom constituting the metal atom-carbon atom bond is a carbon atom constituting a monovalent hydrocarbon group (e.g., an alkyl group or alkenyl group). The third metal alkoxide contains only one such a metal atom-carbon atom bond in a molecule. The metal atom of the third metal alkoxide is Li, Na, Mg, K, Ca, Cu, Sr, Y, Ba, Ce, Ta, Bi, Si, Ti, Al, or Zr, preferably Si, Ti, Al, or Zr, more preferably Si, Ti, or Al, still more preferably Si or Al, and particularly preferably Si. The third metal alkoxide reduces the surface free energy of the coating film 3 and imparts more sufficient slip properties to the surface of the coating film 3. It is considered that such more sufficient slip properties are based on the monovalent hydrocarbon group ($R^{12}$) possessed by the third metal alkoxide, which will be described later.

The third metal alkoxide may be, for example, a compound represented by the general formula (3) below.

$$R^{12}—Si(OR^{11})_3 \quad (3)$$

In the formula (3), $R^{11}$s are each independently an alkyl group having 1 to 10 carbon atoms, and from the viewpoint of higher relative permeability and specific resistance, preferably an alkyl group having 1 to 5 carbon atoms, and more preferably an alkyl group having 1 to 3 carbon atoms. Examples of such an alkyl group include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, an n-nonyl group, and an n-decyl group. All $R^{11}$s may be each independently selected from the alkyl groups described above, or all $R^{11}$s may be the same group selected from the alkyl groups described above.

$R^{12}$ is a monovalent hydrocarbon group having 8 to 30 carbon atoms, and from the viewpoint of higher relative permeability and specific resistance, preferably a monovalent hydrocarbon group having 12 to 24 carbon atoms, and more preferably a monovalent hydrocarbon group having 14 to 20 carbon atoms. The monovalent hydrocarbon group as $R^{12}$ may be a saturated aliphatic hydrocarbon group (e.g., an alkyl group), or may be an unsaturated aliphatic hydrocarbon group (e.g., an alkenyl group). From the viewpoint of higher relative permeability and specific resistance, the monovalent hydrocarbon group as $R^{12}$ is preferably a saturated aliphatic hydrocarbon group (in particular, an alkyl group). Examples of the monovalent saturated aliphatic hydrocarbon group (in particular, an alkyl group) as $R^{12}$ include an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an eicosyl group.

Specific examples of the compound (3) represented by such a general formula are shown in the table below.

TABLE 13

| Specific examples of compound (3) | | | | |
|---|---|---|---|---|
| Compound | $R^{12}$ | $R^{11}$ | $R^{11}$ | $R^{11}$ |
| 3A-1 | Octadecyl group | Methyl group | Methyl group | Methyl group |
| 3A-2 | Hexadecyl group | Methyl group | Methyl group | Methyl group |
| 3A-3 | Decyl group | Methyl group | Methyl group | Methyl group |
| 3A-4 | Octadecyl group | Ethyl group | Ethyl group | Ethyl group |
| 3A-5 | Hexadecyl group | Ethyl group | Ethyl group | Ethyl group |
| 3A-6 | Decyl group | Ethyl group | Ethyl group | Ethyl group |

The compound (3) represented by the general formula (3) can be obtained as a commercial product or can be produced by a known method.

For example, the compound (3) can be obtained as octadecyltrimethoxysilane (manufactured by Tokyo Chemical Industry Co., Ltd.), hexadecyltrimethoxysilane (manufactured by Tokyo Chemical Industry Co., Ltd.), and decyltrimethoxysilane (manufactured by Tokyo Chemical Industry Co., Ltd.), which are commercial products.

The mixing amount of the third metal alkoxide to obtain the coating film 3 (i.e., a reaction product constituting the coating film) is usually 0% by weight or more and 50% by weight or less (i.e., from 0% by weight to 50% by weight) relative to the total weight of the first metal alkoxide and the second metal alkoxide, and from the viewpoint of higher relative permeability and specific resistance, is preferably 2% by weight or more and 50% by weight or less (i.e., from 2% by weight to 50% by weight). The coating film may be produced using two or more third metal alkoxides, and in this case, the total amount thereof is within the range described above. The mixing amount of the third metal alkoxide to obtain the coating film 3 may be the ratio of the mixing amount of the third metal alkoxide to the total mixing amount of the first metal alkoxide and the second metal alkoxide.

The coating film 3 usually has an average thickness of, for example, 1 nm or more and 200 nm or less (i.e., from 1 nm to 200 nm), and in particular, 1 nm or more and 100 nm or less (i.e., from 1 nm to 100 nm).

The average thickness of the coating film can be measured by observing a cross section of a magnetic particle with a scanning transmission electron microscope (STEM, HD-2300A (manufactured by Hitachi High-Technologies Corp)). Two points per particle, 10 particles in total, may be measured, and an average value thereof may be used as the average thickness.

[Method for Producing Magnetic Particles]

Magnetic particles of the present disclosure can be produced by a method including stirring cores made of a magnetic material together with predetermined metal alkoxides in a solvent. Cores made of a magnetic material, each having an insulating coating film formed in advance on the surface thereof, may be used. The predetermined metal alkoxides refer to a metal alkoxide mixture including at least a first metal alkoxide and a second metal alkoxide. The solvent is preferably an alkaline solvent. After stirring, specifically, by filtering and washing the cores made of a magnetic material, followed by heating and drying, magnetic particles in which a coating film having a network structure is formed on each of the cores made of a magnetic material can be obtained. Note that the method of covering is not limited to the method described above as long as the surface of the core made of a magnetic material can be covered with the predetermined metal alkoxide mixture, and any other known coating method, such as spraying or dry mixing, may be used. Accordingly, magnetic particles of the present disclosure can be produced by a method including mixing cores made of a metal magnetic material, a first metal alkoxide, a second metal alkoxide, and a solvent; and hydrolyzing and drying the first metal alkoxide and the second metal alkoxide.

The mixing ratio (i.e., use amount ratio) of the first metal alkoxide and the second metal alkoxide (and a third metal alkoxide included as desired) in the solvent is usually directly related to the content ratio of a component derived from the first metal alkoxide and a component derived from the second metal alkoxide (and a component derived from the third metal alkoxide included as desired) in the coating film, and therefore, the mixing ratio may be set according to a desired content ratio.

The ratio of the total mixing amount of the first metal alkoxide and the second metal alkoxide (and the third metal alkoxide included as desired) to the solvent is not particularly limited as long as the magnetic particles of the present disclosure can be obtained. By adjusting the ratio of the total mixing amount of the first metal alkoxide and the second metal alkoxide (and the third metal alkoxide included as desired) to the solvent, the content (i.e., covering amount) of the coating film in each magnetic particle can be controlled. Specifically, as the ratio of the total mixing amount increases, the thickness of the coating film increases. On the other hand, as the ratio of the total mixing amount decreases, the thickness of the coating film decreases.

The solvent to be used is not particularly limited as long as it does not inhibit the reaction of the metal alkoxides, such as the first metal alkoxide and the second metal alkoxide (and the third metal alkoxide included as desired), and for example, a monoalcohol, an ether, a glycol, or a glycol ether is preferable. In a preferred embodiment, examples of the solvent can include monoalcohols such as methanol, ethanol, 1-propanol, 2-propanol, 1-butanol, 2-butanol, isobutyl alcohol, 1-pentanol, 2-pentanol, and 2-methyl-2-pentanol; ethers such as 2-methoxyethanol, 2-ethoxyethanol, and 2-butoxyethanol; glycols such as ethylene glycol, diethylene glycol, triethylene glycol, and propylene glycol; and glycol ethers such as dipropylene glycol monomethyl ether, diethylene glycol monomethyl ether, diethylene glycol monoethyl ether, diethylene glycol monobutyl ether, triethylene glycol monomethyl ether, and diethylene glycol monohexyl ether. A preferable solvent is a monoalcohol. Furthermore, the solvent may contain water as required. The solvents described above may be used alone, or two or more of them may be used.

The solvent may contain various additives, such as a catalyst, a pH adjuster, a stabilizing agent, and a thickener. Examples of the additives include acid compounds, such as boric acid compounds, and base compounds, such as ammonium salts. A solvent usually can be made alkaline by incorporation of ammonia or a base compound. The content of a base compound in an alkaline solvent is not particularly limited as long as the sol-gel reaction of metal alkoxides proceeds.

The mixing amount of the solvent during stirring is usually not particularly limited, and for example, may be 10% by weight or more and 100% by weight or less (i.e., from 10% by weight to 100% by weight), preferably 20% by weight or more and 80% by weight or less (i.e., from 20% by weight to 80% by weight), relative to the total amount of the cores made of a magnetic material and the solvent.

It is considered that by stirring the cores made of a magnetic material together with the predetermined metal alkoxides in a solvent, the sol-gel reaction of the metal alkoxides proceeds on the surfaces of the cores made of a magnetic material, and a network structure is formed.

The temperature of the mixture during stirring is not particularly limited as long as a network structure is formed while the metal alkoxides are uniformly present on the surfaces of the cores made of a magnetic material, and for example, may be 10° C. or higher and 70° C. or lower, preferably 15° C. or higher and 35° C. or lower.

The stirring time is also not particularly limited as long as a network structure is formed while the metal alkoxides are uniformly present on the surfaces of the cores made of a magnetic material, and for example, may be 10 minutes or more and 5 hours or less (i.e., from 10 minutes to 5 hours), preferably 30 minutes or more and 3 hours or less (i.e., from 30 minutes to 3 hours).

Washing is performed to remove the residual catalyst. For example, washing is performed by bringing the residue from filtration into contact with a washing solvent. The washing solvent is not particularly limited, and for example, may be acetone. Note that it is optional to perform washing.

By heating and drying, the solvent used in washing is removed. The heating temperature is usually 15° C. or higher (in particular, 15° C. or higher and 250° C. or lower), and from the viewpoint of solvent removal, preferably 15° C. or higher and 200° C. or lower. The heating time is usually 30 minutes or more (in particular, 30 minutes or more and 24 hours or less (i.e., from 30 minutes to 24 hours)), and from the viewpoint of solvent removal, preferably 60 minutes or more and 12 hours or less (i.e., from 60 minutes to 12 hours).

[Magnetic Core and Coil Component]

The present disclosure also provides a magnetic core including the magnetic particles of the present disclosure. A magnetic core using the magnetic particles of the present disclosure has high relative permeability and high specific resistance. Therefore, when a magnetic core of the present disclosure is used as a magnetic core of a coil component, eddy current loss can be suppressed while exhibiting high electrical characteristics. A magnetic core of the present disclosure may be a dust core obtained by compression molding of the magnetic particles of the present disclosure.

Figure 4:
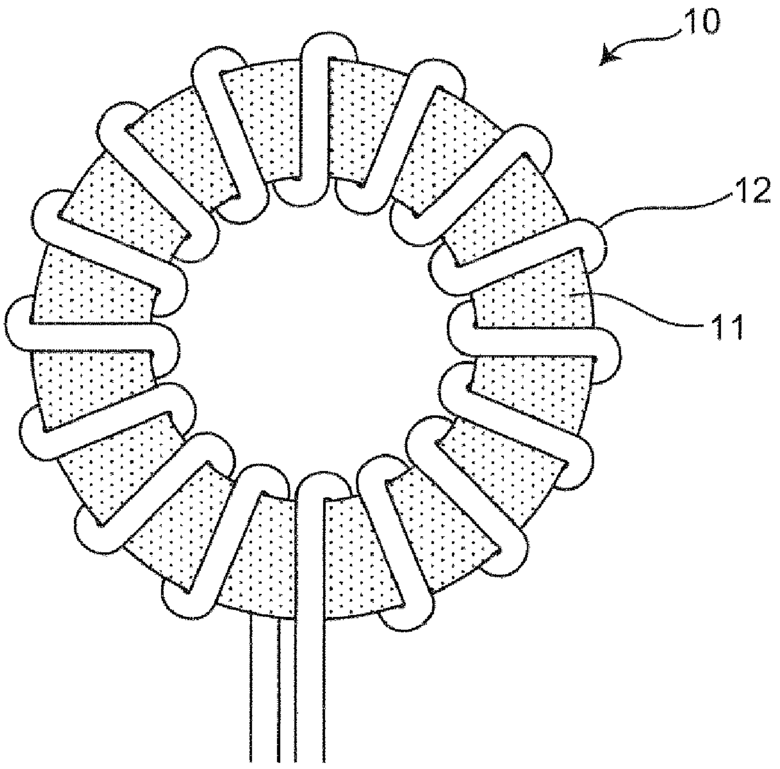
FIG. 4 is a schematic sketch showing a front view of a coil component including a magnetic core of the present disclosure.

The present disclosure also provides, as shown in FIG. 4, a coil component 10 including a dust core 11 of the present disclosure described above, and a coil 12 wound around the dust core. FIG. 4 is a schematic sketch showing a front view of a coil component including a dust core of the present disclosure.

The dust core 11 of the present disclosure can be produced by a known method in the relevant field. For example, a dust core of the present disclosure can be obtained by performing compression molding on mixed powder in which a binder (e.g., a resin such as a silicone resin) is added to magnetic particles of the present disclosure, and performing heat treatment on the resulting compression molded body.

Figure 5:
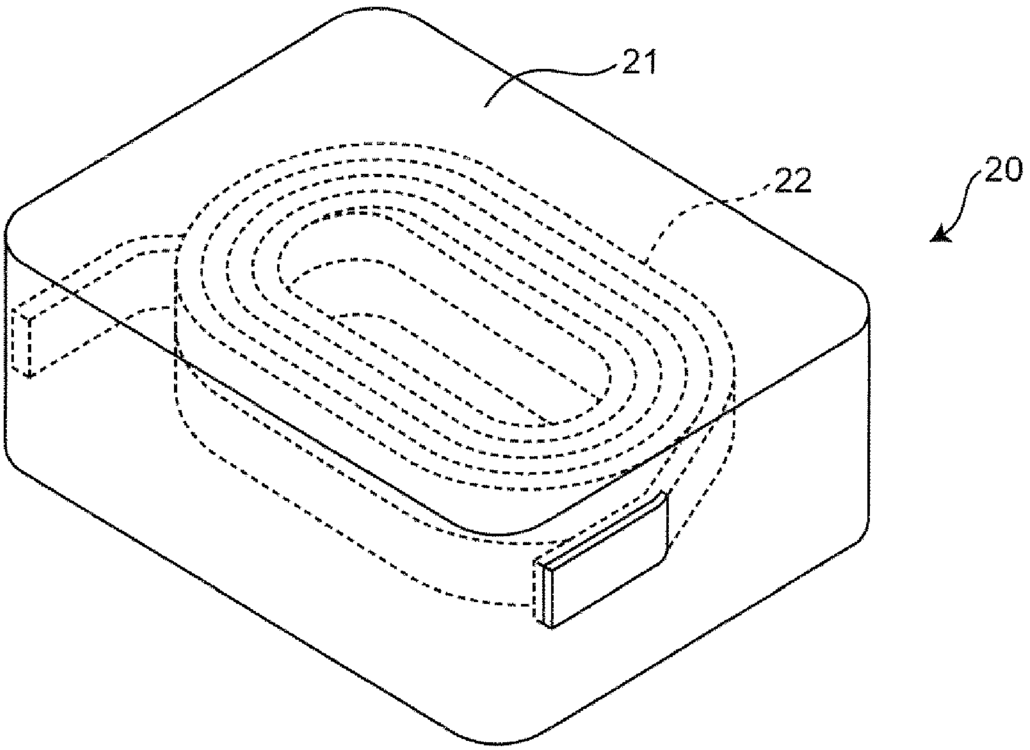
FIG. 5 is a schematic perspective view showing another coil component including magnetic particles of the present disclosure.

Furthermore, the present disclosure also provides, as shown in FIG. 5, a coil component 20 including a body 21 which contains magnetic particles of the present disclosure and a resin (e.g., a silicone resin), and a coil 22 embedded in the body. FIG. 5 is a schematic perspective view showing another coil component including magnetic particles of the present disclosure.

The coil component 20 of the present disclosure can be produced by a known method in the relevant field. For example, a coil component 20 of the present disclosure can be obtained by embedding a coil 22 in mixed powder in which a binder (e.g., a resin such as an epoxy resin or silicone resin) is added to magnetic particles of the present disclosure, performing compression molding, and performing heat treatment on the resulting compression molded body.

EXAMPLES (Example A1, Comparative Examples A1 to A3, Examples B1 to B4, and Examples C1 to C3)

70 g of ethanol in which 10.0 g of 16% (by weight) ammonia water was dissolved was prepared. A first metal alkoxide and a second metal alkoxide were added to this solution such that the use amounts thereof relative to 100 parts by weight of cores made of a magnetic material to be added later corresponded to the use amounts in each Example (or each Comparative Example) (i.e., the amounts described in Tables 14 to 16).

Next, 30 g of cores made of a magnetic material (Fe—Si—Cr alloy) (average particle 30 μm) was added thereto, followed by stirring at 25° C. for 120 minutes. The reaction solution was subjected to separation by filtration, and treated powder was dried at 80° C. for 120 minutes to thereby form an insulating coating film on the surface of each core made of a magnetic material. Thus, magnetic particles were obtained.

Next, the resulting magnetic particles and an epoxy resin serving as a binder (4.2 parts by weight relative to 100 parts by weight of the magnetic material) were mixed, compression molding was performed at a pressure of 400 MPa, and heating was performed at 200° C. for one hour. In such a manner, a toroidal core (i.e., a dust core) with an inside diameter of 4 mm, an outside diameter of 9 mm, and a thickness of 1 mm and a square plate sample of 3 mm×3 mm×1 mm were produced.

(Evaluation)

Relative Permeability

By using an RF impedance analyzer (E4991A) manufactured by Agilent Technologies, Ltd., the relative permeability of the resulting toroidal coil at 1 MHZ and 1 Vrms was measured (the average value when n=3 is shown in Tables). The average value of relative permeability was evaluated based on the following criteria:

⊙⊙: 35 or more (best);

⊙: 32 or more and less than 35 (i.e., from 32 to less than 35) (very good);

○: 30 or more and less than 32 (i.e., from 30 to less than 32) (good); and

×: less than 30 (failed).

The evaluation result "○" or higher was considered as passed.

Specifically,

Specific Resistance

By using a high resistance meter (R8340A ULTRA HIGH RESISTANCE METER) manufactured by Advantest Corporation, a direct voltage of 900 V was applied to the square plate sample, a resistance after 5 seconds was measured, and a specific resistance was calculated from the sample size (the average value when n=3 is shown in Tables). The average value of specific resistance was evaluated based on the following criteria:

⊙⊙: $5\times10^{12}$ Ω·cm or more (best);

⊙: $1\times10^{10}$ Ω·cm or more and less than $5\times10^{12}$ Ω·cm (i.e., from $1\times10^{10}$ Ω·cm to less than $5\times10^{12}$ Ω·cm) (very good);

○: $1\times10^{8}$ Ω·cm or more and less than $1\times10^{10}$ Ω·cm (i.e., from $1\times10^{8}$ Ω·cm to less than $1\times10^{10}$ Ω·cm) (good); and ×: less than $1\times10^{8}$ Ω·cm (failed).

The evaluation result "○" or higher was considered as passed.

Comprehensive Evaluation

Evaluation was comprehensively performed based on the evaluation results of relative permeability and specific resistance.

⊙⊙: Two evaluation results were ⊙⊙;

⊙: Out of two evaluation results, the lowest evaluation result was ⊙;

○: Out of two evaluation results, the lowest evaluation result was ○; and

×: Out of two evaluation results, the lowest evaluation result was ×.

The comprehensive evaluation result "○" or higher was considered as passed. The comprehensive evaluation result "×" was considered as failed.

(Measurement)

Average Thickness of Coating Film 3

The average thickness of the coating film was measured by an HD-2300A (manufactured by Hitachi High-Technologies Corp).

metal alkoxide, the filling performance of the magnetic particles is sufficiently better, and therefore, higher relative permeability can be achieved. Because of stress relaxation properties of the coating film obtained by the second metal alkoxide, the fracture resistance of the coating film is sufficiently better, and therefore, higher specific resistance can be maintained after ring forming.

It is clear from Comparative Example A1 that with the magnetic powder alone, resistance is low. Since a coating film is not present, it is clear that specific resistance decreases.

It is clear from Comparative Example A2 that with the first metal alkoxide only, both relative permeability and specific resistance are low. With the first metal alkoxide only, the filling performance of the magnetic particles is low, and therefore it is considered that relative permeability decreases. With the first metal alkoxide only, the stress relaxation properties of the coating film are low, and the coating film is fractured during ring forming. Therefore, it is considered that specific resistance decreases.

TABLE 14

| | Cores made of magnetic material | First metal alkoxide Type | First metal alkoxide Amount x(1) (parts by weight) | Second metal alkoxide Type | Second metal alkoxide Amount y(1) (parts by weight) | Coating film Composition (2) x/y | Relative permeability Measured value | Relative permeability Evaluation | Specific resistance Measured value (Ω-cm) | Specific resistance Evaluation | Comprehensive evaluation |
|---|---|---|---|---|---|---|---|---|---|---|---|
| Example A1 | FeSiCrB | Tetraethoxysilane | 2.0 | 1,6-Bis(trimethoxysilyl)hexane | 1.0 | 67/33 | 35 | ⊙⊙ | $5.2 \times 10^{12}$ | ⊙⊙ | ⊙⊙ |
| Comparative Example A1 | FeSiCrB | — | 0 | — | 0 | — | 40 | ⊙⊙ | $3.2 \times 10^{4}$ | × | × |
| Comparative Example A2 | FeSiCrB | Tetraethoxysilane | 2.0 | — | 0 | 100/0 | 19 | × | $7.4 \times 10^{6}$ | × | × |
| Comparative Example A3 | FeSiCrB | — | 0 | 1,6-Bis(trimethoxysilyl)hexane | 1.0 | 0/100 | 25 | × | $5.4 \times 10^{4}$ | × | × |

(1) Value relative to 100 parts by weight of cores made of magnetic material;
(2) Ratio (weight %) when x + y = 100;
"—" denotes "not mixed" or "not evaluated".

It is clear from comparison among Example A1 and Comparative Examples A1 to A3 that by producing a coating film using a first metal alkoxide and a second metal alkoxide, a dust core can have sufficiently higher relative permeability and specific resistance. Because of slip properties due to the divalent hydrocarbon group possessed by the second It is clear from Comparative Example A3 that with the second metal alkoxide only, both relative permeability and specific resistance are low. With the second metal alkoxide only, the strength of the coating film is low, and the coating film is fractured during ring forming. Therefore, it is considered that specific resistance decreases.

TABLE 15

| | Cores made of magnetic material | First metal alkoxide Type | First metal alkoxide Amount x(1) (parts by weight) | Second metal alkoxide Type | Second metal alkoxide Amount y(1) (parts by weight) | Coating film Composition (2) x/y | Relative permeability Measured value | Relative permeability Evaluation | Specific resistance Measured value (Ω-cm) | Specific resistance Evaluation | Comprehensive evaluation |
|---|---|---|---|---|---|---|---|---|---|---|---|
| Example A1 | FeSiCrB | Tetraethoxysilane | 2.0 | 1,6-Bis(trimethoxysilyl)hexane | 1.0 | 67/33 | 35 | ⊙⊙ | $5.2 \times 10^{12}$ | ⊙⊙ | ⊙⊙ |
| Example B1 | FeSiCrB | Tetraethoxysilane | 2.0 | 1,2-Bis(trimethoxysilyl)ethane | 1.0 | 67/33 | 32 | ⊙ | $9.4 \times 10^{12}$ | ⊙⊙ | ⊙ |

TABLE 15-continued

| | Cores made of magnetic material | First metal alkoxide | | Second metal alkoxide | | Coating film Composition (2) x/y | Relative permeability | | Specific resistance | | Comprehensive evaluation |
|---|---|---|---|---|---|---|---|---|---|---|---|
| | | Type | Amount x(1) (parts by weight) | Type | Amount y(1) (parts by weight) | | Measured value | Evaluation | Measured value (Ω-cm) | Evaluation | |
| Example B2 | FeSiCrB | Tetraethoxysilane | 2.0 | 1,8-Bis(trimethoxysilyl)octane | 1.0 | 67/33 | 33 | ⊙ | $1.1 \times 10^{12}$ | ⊙ | ⊙ |
| Example B3 | FeSiCrB | Tetraethoxysilane | 2.0 | 1,10-Bis(trimethoxysilyl)decane | 1.0 | 67/33 | 34 | ⊙ | $6.4 \times 10^{8}$ | ○ | ○ |
| Example B4 | FeSiCrB | Tetraethoxysilane | 2.0 | 1,1-Bis(trimethoxysilyl)methane | 1.0 | 67/33 | 32 | ⊙ | $8.1 \times 10^{8}$ | ○ | ○ |

(1) Value relative to 100 parts by weight of cores made of magnetic material;
(2) Ratio (weight %) when x + y = 100;
"—" denotes "not mixed" or "not evaluated".

It is clear from Examples A1 and B1 to B4 that by using both the first metal alkoxide and the second metal alkoxide, the dust core can have sufficiently higher relative permeability and specific resistance.

It is clear from comparison among Examples A1 and B1 and B2 and Examples B3 and B4 that when the number of carbon atoms of the divalent hydrocarbon group of the second metal alkoxide is 2 to 8, higher relative permeability and specific resistance can be obtained.

It is clear from comparison among Example A1 and Examples B1 to B4 that when the number of carbon atoms of the divalent hydrocarbon group of the second metal alkoxide is 3 to 7 (in particular, 4 to 7), sufficiently higher relative permeability and specific resistance can be obtained.

TABLE 16

| | Cores made of magnetic material | First metal alkoxide | | Second metal alkoxide | | Coating film Composition (2) x/y | Relative permeability | | Specific resistance | | Comprehensive evaluation |
|---|---|---|---|---|---|---|---|---|---|---|---|
| | | Type | Amount x(1) (parts by weight) | Type | Amount y(1) (parts by weight) | | Measured value | Evaluation | Measured value (Ω-cm) | Evaluation | |
| Example A1 | FeSiCrB | Tetraethoxysilane | 2.0 | 1,6-Bis(trimethoxysilyl)hexane | 1.0 | 67/33 | 35 | ⊙⊙ | $5.2 \times 10^{12}$ | ⊙⊙ | ⊙⊙ |
| Example C1 | FeSiCrB | Aluminum triisopropoxide | 2.0 | 1,6-Bis(trimethoxysilyl)hexane | 1.0 | 67/33 | 33 | ⊙ | $4.9 \times 10^{11}$ | ⊙ | ⊙ |
| Example C2 | FeSiCrB | Titanium tetraisopropoxide | 2.0 | 1,6-Bis(trimethoxysilyl)hexane | 1.0 | 67/33 | 34 | ⊙ | $2.4 \times 10^{10}$ | ⊙ | ⊙ |
| Example C3 | FeSiCrB | Zirconium tetraisopropoxide | 2.0 | 1,6-Bis(trimethoxysilyl)hexane | 1.0 | 67/33 | 31 | ○ | $3.3 \times 10^{11}$ | ⊙ | ○ |

(1) Value relative to 100 parts by weight of cores made of magnetic material;
(2) Ratio (weight %) when x + y = 100;
"—" denotes "not mixed" or "not evaluated".

It is clear from Examples A1 and C1 to C3 that even when the metal of the first metal alkoxide is other than Si, the dust core can have sufficiently higher relative permeability and specific resistance.

It is clear from comparison among Examples A1 and C1 and C2 and Example C3 that when the metal of the first metal alkoxide is Si, Al, or Ti, higher relative permeability and specific resistance can be obtained.

It is clear from comparison among Example A1 and Examples C1 to C3 that when the metal of the first metal alkoxide is Si, sufficiently higher relative permeability and specific resistance can be obtained.

Magnetic particles of the present disclosure can be suitably used as a material for a coil component. Examples of the coil component include inductors and choke coils.

What is claimed is:

1. Magnetic particles, each comprising a core made of a metal magnetic material, and a coating film which covers a surface of the core, wherein the coating film contains a structure derived from a reaction between a first metal alkoxide containing no metal atom-carbon atom bond in a molecule, and a second metal alkoxide containing two or more metal atom-carbon atom bonds in a molecule, wherein the first metal alkoxide is from 5% by weight to 95% by weight and the second metal alkoxide is from 5% by weight to 95% by weight, and the weight ratio is a ratio where the total weight of the first metal alkoxide and the second metal alkoxide is 100% by weight.

2. The magnetic particles according to claim 1, wherein the first metal alkoxide is a compound or a mixture of two or more compounds represented by the general formula (1) below:

$$M^1(OR^1)_x \quad (1)$$

wherein, in the formula (1), $M^1$ is Li, Na, Mg, K, Ca, Cu, Sr, Y, Ba, Ce, Ta, Bi, Si, Ti, Al, or Zr;

x is the valence of $M^1$ and is an integer of 1 to 4;

$R^1$s are each independently an alkyl group having 1 to 10 carbon atoms or —C($R^2$)═CH—CO—$R^3$ (in the formula, $R^2$ is an alkyl group having 1 to 10 carbon atoms, and $R^3$ is an alkyl group having 1 to 30 carbon atoms, an alkyloxy group having 1 to 30 carbon atoms, or an alkenyloxy group having 1 to 30 carbon atoms); and among $R^1$s, when two adjacent $R^1$s are the alkyl groups, the two adjacent $R^1$s may be joined to each other to configure a ring, together with the oxygen atoms to which the two $R^1$s are attached and the $M^1$ atom to which the oxygen atoms are attached.

3. The magnetic particles according to claim 1, wherein the second metal alkoxide is a compound having two or more Si atom-carbon atom bonds in a molecule.

4. The magnetic particles according to claim 1, wherein the second metal alkoxide is a compound or a mixture of two or more compounds represented by the general formula (2A) below:

$$(R^{211}O)_3Si—R^{31}—Si(OR^{212})_3 \quad (2A)$$

wherein, in the formula (2A), $R^{211}$ and $R^{212}$ are each independently an alkyl group having 1 to 10 carbon atoms; and $R^{31}$ is a divalent hydrocarbon group having 1 to 20 carbon atoms.

5. The magnetic particles according to claim 4, wherein in the general formula (2A), $R^{31}$ is a divalent hydrocarbon group having 1 to 10 carbon atoms.

6. The magnetic particles according to claim 5, wherein in the general formula (2A), $R^{31}$ is a divalent hydrocarbon group having 2 to 8 carbon atoms.

7. The magnetic particles according to claim 1, wherein the coating film has an average thickness of from 1 nm to 100 nm.

8. The magnetic particles according to claim 1, wherein the metal magnetic material contains Fe.

9. The magnetic particles according to claim 1, wherein the metal magnetic material is Fe, an Fe—Si alloy, an Fe—Si—Cr alloy, an Fe—Al alloy, an Fe—Si—Al alloy, or an Fe—Ni alloy.

10. A magnetic core comprising the magnetic particles according to claim 1.

11. A coil component comprising:

the magnetic core according to claim 10; and a coil wound around the magnetic core.

12. A coil component comprising:

a body which contains the magnetic particles according to claim 1 and a resin; and a coil embedded in the body.

* * * * *